July 24, 1956 A. D. HERMAN 2,756,079
W-V BAND COUPLING
Filed March 26, 1953

INVENTOR
A. DALE HERMAN
BY Lynn N Latta
—ATTORNEY—

2,756,079
W-V BAND COUPLING

Albert Dale Herman, Encino, Calif., assignor to Marman Products Company, Inc., Los Angeles, Calif., a corporation of California Application March 26, 1953, Serial No. 344,859

4 Claims. (Cl. 285—408)

This invention relates to tube couplings of the type in which flanges on adjoining ends of tube sections are coupled, in fluid sealing relation, by a coupling collar embodying a plurality of annular segments of V-band section embodying inwardly diverging jaws which engage the flanges to apply axial pressure thereto as the segments are constricted toward the axis of the coupling. The invention deals particularly with coupling collars of this general type, in which the collar segments are formed of rolled sheet metal, and in which the problem of obtaining a satisfactory compromise between adequate strength to resist the tendencies of the jaws to spread under the wedging pressure of the tube flanges, and attaining minimum weight in the collar, is always present. The primary object of the present invention is to provide a coupling collar of the V-band type embodying an improved, reinforced cross section having a greater resistance to spreading than has been hitherto attained in a collar of comparable dimensions and weight.

Specifically, the invention contemplates an improved coupling collar having a cross sectional structure which includes, in addition to the conventional V-channel section for embracing the tube flanges, buttress means integrally joined to the respective jaws of the V-channel section and transmitting thereto, support which is derived directly from annular constrictor means which applies radially inward pressure to the collar as a whole.

In the most common form of V-band coupling collar, the jaw segments are attached to the inner wall of a continuous flexible constrictor band having the ends thereof joined by a take-up latching connection, and the tension developed in the band is converted into constricting pressure against the segments. As applied to this type of coupling collar, the invention provides an arrangement wherein the constricting force, derived from the circumferential tension, is applied both to the crown or periphery of the V-channel portion of the collar, and is also directly applied to the radially inward margins of the V-section jaws in a manner to resist spreading thereof.

A further object of the invention is to provide a V-band type coupling collar having integral laterally spaced buttress portions which have marginal edges in abutting inter-engagement across the crown of the V-channel portion of the collar.

In general, the invention contemplates a coupling collar having a cross sectional structure which includes a central portion of V-section having inwardly diverging jaws for wedging engagement against tube flanges, together with lateral buttress portions each of which, in connection with a respective jaw of the central V-section portion, defines a truss-like bracing structure, the entire cross-section resembling the letter W. Accordingly, I choose to designate the novel collar of this invention as a W-V band structure.

As embodied in a coupling of the type utilizing a separate thin flexible continuous constrictor band, the invention also aims to provide a collar structure wherein integral abutment portions are frictionally engaged between the inner wall of the constrictor band and the crown of the V-channel portion of the collar.

A further object of the invention is to provide such a coupling collar, having integral lateral buttress portions terminating in peripheral portions projecting toward each other from the radially outward extremities thereof, in an arrangement such as to dispense with the necessity for welding or otherwise securing the marginal portions of the collar.

An important object of the invention is to provide a coupling collar of rolled sheet metal having buttressing bracing extending between the remote extremities of the wedging jaws thereof and the crown thereof, said buttressing bracing having the several functions of: (1) deriving hoop tension from a constrictor band and converting the same into radially inwardly directed pressure against the crown of the V-channel portion of the collar so as to support the same; (2) providing a truss structure which transmits to the remote margins of the frustroconical flange-engaging jaws of the central V-section portion of the collar, radially inwardly directed forces derived from hoop tension in the peripheral portion of the collar, in a manner to brace said inner margins against spreading under the axial pressure of the tube flanges thereagainst.

Other objects will become apparent in the ensuing specifications and appended drawings in which.

Figure 1:
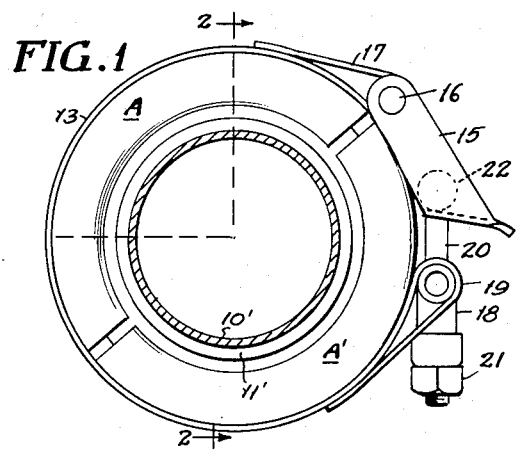
Fig. 1 is a transverse sectional view through a line of tubing having embodied therein, as the means for joining the sections thereof, a coupling collar embodying the invention.

*Embodiment of the invention in constrictor band type coupling—Fig. 1*

Figure 2:
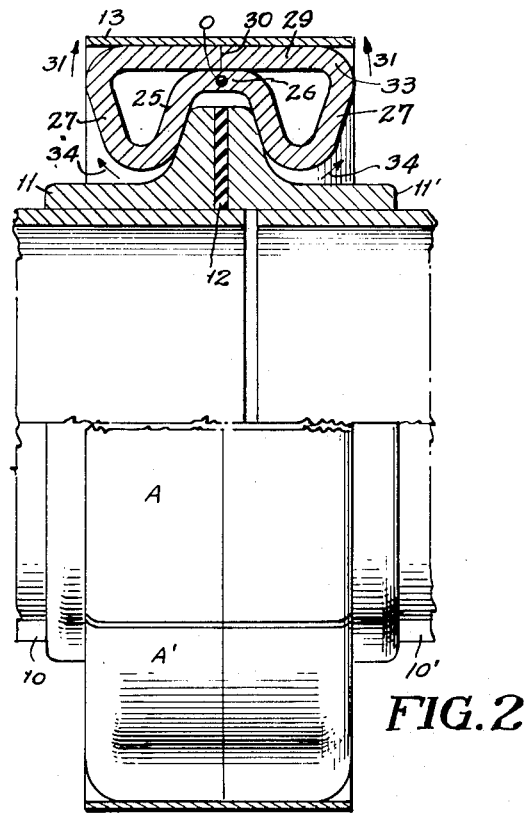
Fig. 2 is a view of the same partially in axial section and partially in side elevation, taken as indicated by the line 2—2 of Fig. 1.

Referring now to the drawings in detail, I have shown in Figs. 1 and 2, as an example of one general type of coupling in which the invention may be embodied, a collar for coupling together the aligned ends of tube sections 10 and 10' having flanges 11, 11' which are clamped together, with some type of sealing connection therebetween, such as the packing washer 12, axial clamping pressure being applied to the flanges 11, 11' by my improved coupling collar which, as shown in these two figures, is of the type including a pair of collar segments A and A' encircled by a continuous flexible band 13 of thin ribbon metal. For the purpose of maintaining the several parts of the collar in assembly, the segments each may be spot welded to the inner wall of band 13 at some point along its arcuate extent, although it is to be understood that the invention is not restricted to the attachment of the segments to the band, but contemplates the possibility of simply engaging the segments within the band, tightening the band around the segments, and relying upon frictional inter-engagement to hold the parts in assembly.

For developing hoop tension in band 13, the invention may utilize a conventional quick coupler take-up latching connection including a latch 15 pivotally connected by a pintle 16 to a loop 17 at one end of the band, a tubular T-trunnion 18 pivotally monuted in a loop 19 in the other end of the band, and a T-bolt including a shank 20 extending through T-trunnion 18, having a nut 21 threaded on the end thereof and engaging trunnion 18 to draw the T-bolt therethrough, and having a T-head 22 releasably engageable by latch 15. Hoop tension in the collar is developed by advancing nut 21 on bolt shank 20 so as to apply pressure through T-trunnion 18 to loop 19 at the one end of the band while the other end of the band is anchored by latch 15.

In each of the several forms of the invention, collar segments A, A' include a centrally disposed V-channel portion of conventional design, for embracing and exerting wedging pressure against the flanges 11, 11'. This central portion of a collar segment includes a pair of opposed frustoconical, radially inwardly diverging side wall or jaw portions 25 which are integrally joined by a peripheral web or crown portion 26. As the V-channel portions 25, 26 of the collar are constricted inwardly against flanges 11, 11', the wedging engagement therewith will develop axial pressure against the flanges 11, 11', for clamping them together or against packing washer 12, and equal and opposite reactive pressures will be exerted by the flanges 11, 11' against the jaws 25, tending to spread the latter. In conventional rolled sheet metal collar segments, the problem of reinforcing the jaws 25 against spreading has been met (1) by reinforcing flanges at the inner margins of the jaws; and (2) by using fairly thick sheet metal as the material from which the segments are fabricated. Where these coupling collars are used in aircraft installations, there is a very strong demand for reduction of weight to a minimum. This of course cannot be accomplished at the risk of unduly weakening the resistance of the jaws to spreading, and one of the primary objects of the present invention is to make it possible to utilize a more light weight material in the collar segments while providing ample reinforcement against spreading of the jaws.

*The invention as disclosed in Fig. 2*

As an example of one form in which the invention may be embodied in a constrictor band type coupling such as that described above, I have shown in Fig. 2 a coupling collar wherein each of the segments A, A' includes a buttress flange 27 projecting radially outwardly from the radially inner extremity of a respective jaw 25, being integrally connected thereto by a rolled band 28. The buttress flanges 27 are braced against the inner wall of constrictor band 13 so as to receive therefrom, radially inwardly directed pressure which is derived from the hoop tension in band 13. In this particular form of the invention, the buttress flanges 27 engage the constrictor band 13 through the medium of cylindrical peripheral flanges 29 which project axially toward each other and have their marginal edges 30 in abutting inter-engagement, around a circle which is disposed in the median circumferential plane of the collar, bisecting V-channel crown 26. The marginal portions of peripheral flanges 29 rest against the crown portion 26 of the collar. When the collar is constricted around flanges 11, 11', these marginal portions of flanges 29 will tend to be pressed against crown portion 26 by the constricting action of band 13, pressing inwardly, and the reactive outward pressure of crown portion 26, supported by the seating of jaws 25 against flanges 11, 11'. The clamping of flanges 29 between band 13 and crown 26 has some effect in securing the parts in position and tends to inhibit any tendency of edges 30 to become displaced with reference to each other or to buckle under the axial compression.

Fig. 2 discloses a form of the invention wherein the buttress walls 27 diverge radially outwardly, whereby the truss section which is provided by each buttress wall 27 and its adjacent jaw 25, is of a preferred truss shape wherein both sides thereof are inclined outwardly toward the base of the truss (which in this invention is the flange 29).

At this point it may be noted that the particular segment structure shown in Fig. 2 (as well as the modified segment sections shown in the other figures) may be utilized either in combination with the constrictor band 13 or without the band 13, the hoop tension in the latter case being developed in the segments themselves, particularly in the peripheral flanges 29 thereof. Where this is the case, such hoop tension results in radially inward pressure of the marginal portions of the flanges 29 against crown 26 where they bear upon the same, and any buckling tendency in flanges 29 will be resisted by the inter-action of the radially constrictive forces drawing flanges 29 inwardly against crown 26 and the radially outward reactive pressure of crown 26, supporting the flanges 29.

*Operation of the invention—Fig. 2*

As the coupling collar is drawn tightly around flanges 11, 11', developing reactive outward pressures of flanges 11, 11' against jaws 25, 25 tending to spread the latter, there will be a tendency for the respective halves of the collar section to bend around an axis located near the center of crown 26 as indicated at O. The vectors of the spreading forces applied to jaws 25 will therefore include radially outward compressive stresses in buttress flanges 27, as indicated by arrows 31. These radially outward forces will be transmitted to constrictor band 13 through peripheral flanges 29, and will be balanced by the radially inward forces exerted by band 13 throughout its entire axial extent, said inward forces being derived from the hoop tension therein.

Any tendency of jaws 25 to spread under the wedging pressure of the tube flanges will be equivalent to a tendency of the respective lateral truss portions of the coupling, including jaws 25, buttress flanges 27 and peripheral flanges 29, to tilt about the axes O, which tilting movement would require that the heel portions 33 move radially outwardly as indicated by arrows 31. Such radially outward movements are resisted by the respective side portions of band 13, radially loaded inwardly by the constricting tension therein. With heel portions 33 fulcruming on band 13, the respective truss sections of the collar, as they attempt to rotate with their radially inward extremities tending to spread as indicated by arrows 34, will also have a tendency for their toe portions, located at centers O, to move radially inwardly away from band 13. Such movement is, however, restrained as follows: in the central V-section of the collar, such inward movement will be restrained by the radially outward pressure of the flanges 11, 11' against such V-section.

The above described characteristics are such that it becomes unnecessary to provide any type of securing attachment (such as welding) between the margins of flanges 29 and crown 26, or between the inter-engaging edges 30 of flanges 29. Consequently, the collar segments can be fabricated by a succession of rolling and forming steps in which the segments are first rolled in open channel form, with peripheral flanges 29 lying in substantially parallel radial planes, and are thereafter folded inwardly until the abutting inter-engagement of their edges is established.

Figure 3:
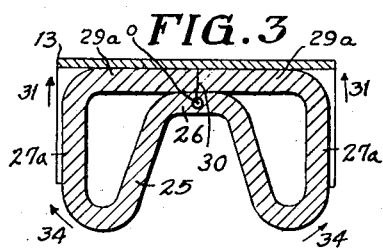
Fig. 3 is a radial sectional view of a collar segment embodying another modified form of the invention.

*The invention as disclosed in Fig. 3*

Fig. 3 illustrates a modified form of the invention in which the buttress flanges 27a are parallel to each other and are disposed in planes at right angles to the coupling collar axis. Peripheral flanges 29a bear frictionally against crown portion 26 of the collar when hoop tension is developed in the band 13 by tightening bolt 20, 21.

Fig. 3 has been selected, in conjunction with Fig. 2, as illustrative of a collar segment adapted to develop its own hoop tension. It will be understood however that the segment of Fig. 3 may as readily be incorporated in a coupling collar utilizing a flexible constrictor band 13 as in Fig. 1, in which case the radially inward loading of buttress flanges 27a, instead of being developed initially by tension in flanges 29a, will be transmitted to flanges 29a from a constrictor band.

Figure 4:
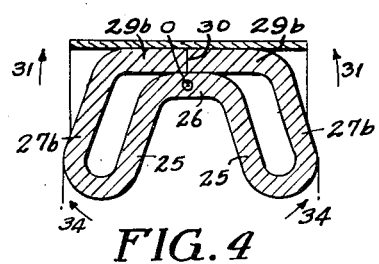
Fig. 4 is a radial sectional view of a collar segment embodying a further modified form of the invention.

*The invention as disclosed in Fig. 4*

Fig. 4 illustrates a modification of the cross-sectional shape of a segment, wherein the buttress flanges 27b are frusto-conical and converge radially outwardly. They may or may not be parallel to the jaws 25, parallelism being shown in Fig. 4. Their peripheral flanges 29b have their edges 30 in abutting inter-engagement as shown.

I claim:

1. A coupling collar for joining together a pair of mating flanges, comprising: a plurality of collar segments of rolled sheet metal, each including in cross section, a central portion of truncated V-section having a crown web and a pair of radially inwardly diverging jaws for wedging embracing engagement of respective portions of said flanges, buttress flanges integral with and return bent generally radially outwardly from the inner extremities of said jaws to approximately the radius of said crown web, and a pair of generally cylindrical peripheral flanges integral with and bent from the outer extremities of the respective buttress flanges toward one another, with their marginal portions bearing radially inwardly against said crown web and frictionally gripping the same when subjected to constricting forces, so as to restrain spreading of said jaws; a relatively thin flexible band encircling and tying together said segments, each segment being attached to said band at a single position circumferentially of the band; and latching means for joining and drawing together the ends of the band so as to apply constricting forces to the segments.

2. A collar as defined in claim 1, wherein said band engages the marginal portions of said peripheral flanges to press them against said crown web, and engages the lateral portions of said peripheral flanges to supply supporting radial forces to said buttress flanges.

3. A collar as defined in claim 1, wherein said buttress flanges diverge radially outwardly.

4. A coupling collar as defined in claim 1, wherein said buttress flanges are normal to the collar axis and the margins of said peripheral flanges are in abutting engagement.

References Cited in the file of this patent

UNITED STATES PATENTS

| | | |
|---|---|---|
| 2,014,313 | Damsel | Sept. 10, 1935 |
| 2,403,606 | Myer | July 9, 1946 |
| 2,424,436 | Crater | July 22, 1947 |
| 2,473,459 | Weise | June 14, 1949 |
| 2,548,249 | Woolsey | Apr. 10, 1951 |
| 2,703,722 | Christopherson | Mar. 8, 1955 |

FOREIGN PATENTS

| | | |
|---|---|---|
| 20,895 | Great Britain | Nov. 5, 1895 |